July 29, 1947.   W. R. CUSTER   2,424,556

MULTIPLE PROPELLER WING CHANNEL

Filed June 17, 1944

Inventor
WILLARD R. CUSTER

By Bernard F. Garvey
Attorney

Patented July 29, 1947

2,424,556

UNITED STATES PATENT OFFICE 2,424,556

MULTIPLE PROPELLER WING CHANNEL

Willard R. Custer, Hagerstown, Md.

Application June 17, 1944, Serial No. 540,837

2 Claims. (Cl. 244—12)

The present application is a continuation in part of my applications, Ser. No. 439,257, filed April 16, 1942; and Ser. No. 456,547, filed August 28, 1942, and its object is to provide channeled wings substantially as shown in the above applications in conjunction with power means at both ends of the channel to further increase lift and further decrease landing and take off speeds.

In the present embodiment of the invention, I use elongated channels, thereby increasing the low pressure surface area in each channel to increase the factor of lift in flight.

It is also within the contemplation of this invention to equip each channel with multiple simultaneously operating propellers which may be mounted in the channel, or outside of the channel, very close to its leading and aft edges.

I have found from experiment that by sealing the leading end of the wing channel and operating power means either in the aft part of the channel or in such close proximity to the aft edge of the channel that propeller tip losses are eliminated, static lift is effected and lift in flight is increased, the propellers being of variable pitch to augment forward motion, at the option of operator, and correspondingly decrease gyroscopic drag.

Figure 1:
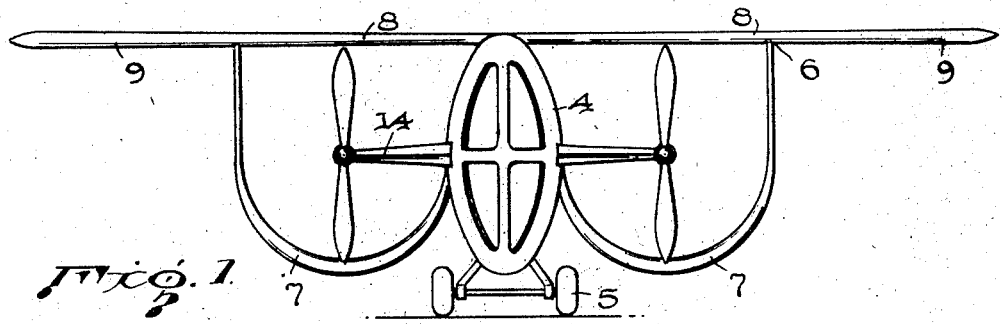
Figure 2:
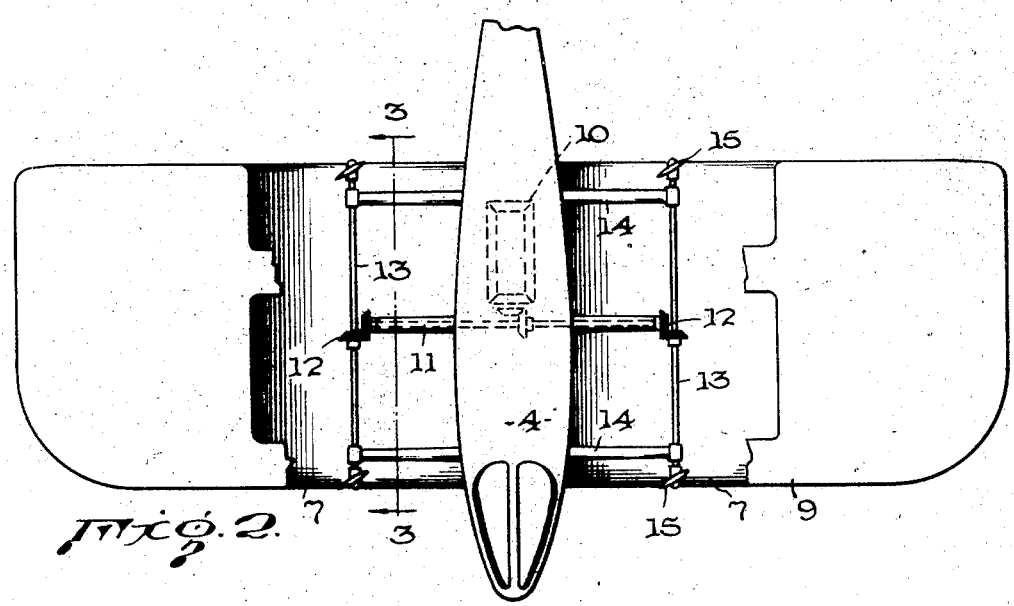
Figure 3:
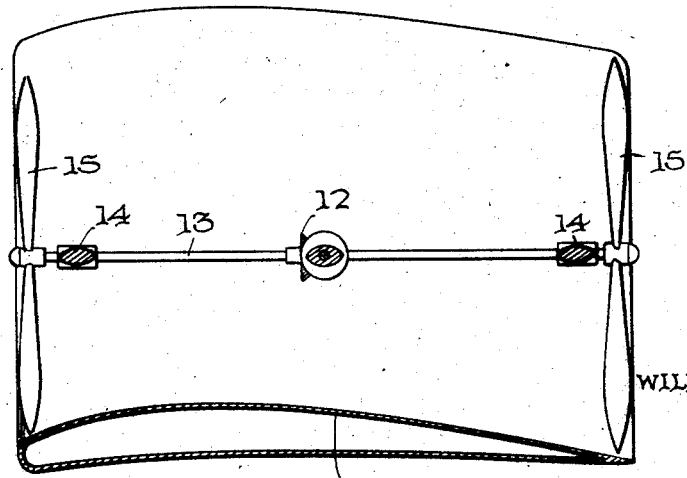

Other objects of the invention will be apparent from the following description of the preferred form of the invention taken in connection with the accompanying drawings, wherein Figure 1 is a front elevational view of an airplane constructed in accordance with the present invention;

Figure 2 is a top plan view showing parts of the wing broken away to disclose details; and Figure 3 is a transverse sectional view through the wing, taken on the line 3—3 of Figure 2, looking in the direction of the arrows.

The invention comprises a fuselage 4 which may be of standard construction and is equipped with a landing gear 5 also of standard construction.

Extending from each side of the fuselage 4 is a wing generally designated 6, including a channel or scoop 7, spars 8 and wing tips 9. The channels extend in the direction of flight and are elongated to provide increased surface area, correspondingly producing a low pressure area on each side of the fuselage, the ratio of length of the fuselage to the low pressure area to the chord of the channel being approximately two to one.

A power plant 10 may be mounted in the fuselage and is operatively connected to a driven shaft 11, the latter extending transversely through the fuselage and being equipped on its opposite ends with gears which mesh with complemental gears 12 formed on shafts 13, the latter being mounted in bearings 14 which extend laterally from the opposite sides of the fuselage 4. The shafts 13 terminate, as shown to advantage in Fig. 3, at approximately the fore and aft edges of the channel 7. A propeller 15 is mounted on each end of each of the shafts 13. The propeller tips are of a length to lie in close proximity to the wall of the channel when the propellers are mounted inboard, as shown in Figure 3. It is of course to be understood, and I have found from experiments, that equally good results may be obtained when the propellers are mounted outboard, arranged to operate in close proximity to the leading and trailing edges of the channel. Also I have found that a propeller may be mounted inboard remote from the trailing edge of the channel, if the tips are mounted to operate in close proximity to the wall of the latter. With any one of these arrangements, tip losses will be reduced to a minimum.

The propellers 15 are of variable pitch to permit adjustment thereof at the option of the operator. I have found that in take-off and landing, best results are obtained by substantially sealing the front of each channel. This is effected by feathering the blades to prevent the passage of air therethrough, permitting the aft propellers to withdraw the air from the channels in back of the front propellers. This permits static lift and also accelerates lift when in flight. Correspondingly, the speed of descent is curtailed when the front of the channels are sealed, thereby decreasing landing speeds. The propellers 15, being mounted on the same power shaft, rotate in the same direction and the variation in the pitch of the propeller blades is effected in a manner well known in the art, during operation of the plane.

With the present invention, the length of the channels, is important. It is also important that the power means, whether propellers 15 or other suitable means, be adjustable to permit the sealing and unsealing of the fronts of the channels and be constantly within the control of the operator. With the device of the present invention, aerodynamic lift is phenomenally increased because the horsepower is applied directly to lift.

I have herein described only structure which I have found from experiment may be used to carry out the objects of this invention. I am aware that numerous changes may be made within the scope of the appended claims.

What I claim is:

1. An airplane including a fuselage, a wing extending from each side of the fuselage, a portion of each wing being channeled fore and aft and opening upwardly, and propellers mounted in each channel in close proximity to the leading and trailing edges thereof, the propeller discs being in close proximity to the walls of the channels to reduce tip losses.

2. An airplane including a fuselage, a wing extending from each side of the fuselage, a part of each of said wings being formed with an upwardly opening channel extending in the direction of flight, each channel extending from the front to the rear edge of the wing, means mounted on the fuselage and arranged to impede the passage of air into the front end of the channel during take-off and landing, and means mounted adjacent the trailing edge of each channel and arranged so as to induce a rearward flow of air through the channel, said last-named means coacting with said impeding means to increase lift and decrease landing speeds.

WILLARD R. CUSTER.

REFERENCES CITED

The following references are of record in the file of this patent:

UNITED STATES PATENTS

| Number | Name | Date |
|---|---|---|
| 1,773,281 | Scott | Aug. 19, 1930 |
| 1,747,334 | Sundstedt | Feb. 18, 1930 |